United States Patent
Jander et al.

(10) Patent No.: US 7,120,330 B2
(45) Date of Patent: *Oct. 10, 2006

(54) APPARATUS FOR FORMING A WDM SIGNAL HAVING ORTHOGONALLY POLARIZED OPTICAL CHANNELS

(75) Inventors: R. Brian Jander, Freehold, NJ (US); Hongbin Zhang, Marlboro, NJ (US); Thomas R. Lawrence, Tinton Falls, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/301,556

(22) Filed: Dec. 13, 2005

(65) Prior Publication Data

US 2006/0153497 A1    Jul. 13, 2006

Related U.S. Application Data

(63) Continuation of application No. 11/032,502, filed on Jan. 10, 2005, now Pat. No. 6,975,790.

(51) Int. Cl.
*G02B 6/28* (2006.01)
(52) U.S. Cl. ..................... 385/24; 398/115
(58) Field of Classification Search ................ 385/25, 385/24; 398/115, 32; 370/372
See application file for complete search history.

(56) References Cited

U.S. PATENT DOCUMENTS

| | | | |
|---|---|---|---|
| 6,975,790 B1 * | 12/2005 | Jander et al. | 385/24 |
| 2002/0181066 A1 * | 12/2002 | Miller | 359/237 |
| 2003/0174312 A1 * | 9/2003 | Leblanc | 356/73.1 |

* cited by examiner

*Primary Examiner*—Akm Enayet Ullah
(74) *Attorney, Agent, or Firm*—Grossman, Tucker, Perreault & Pfleger, PLLC

(57) ABSTRACT

Embodiments of an apparatus for forming a WDM signal having orthogonally polarized optical channels are disclosed. Utilizing the optical channels formed using non-polarization-maintaining components, the apparatus selectively controls a state of polarization (SOP) of each optical channel.

19 Claims, 3 Drawing Sheets

APPARATUS FOR FORMING A WDM SIGNAL HAVING ORTHOGONALLY POLARIZED OPTICAL CHANNELS

CROSS REFERENCE TO RELATED APPLICATIONS

This application is a continuation of U.S. application Ser. No. 11/032,502, filed Jan. 10, 2005, now U.S. Pat. No. 6,975,790.

BACKGROUND

Embodiments of the present invention generally relate to optical transmission systems. In particular, embodiments of the present invention relate to an apparatus for forming a wavelength division multiplexed (WDM) signal having orthogonally polarized optical channels of a fiber-optic transmission system.

Modern fiber-optic transmission systems use wavelength division multiplexed (WDM) techniques to transmit a plurality of optical channels via a single-mode optical fiber. However, non-linear transmission effects in optical fibers may cause interactions between adjacent optical channels that limit performance of such systems.

In WDM systems, cross-channel interference may be reduced by using pair-wise orthogonally polarized optical channels, as described in commonly assigned U.S. Pat. No. 6,134,033, issued Oct. 17, 2000; and U.S. Pat. No. 6,459,515 B1, issued Oct. 1, 2002, the entire disclosures of which are incorporated herein by reference. These systems use polarization-maintaining components, as well as polarization-maintaining fibers. Presently, such components and fibers are expensive and some (e.g., polarization-maintaining dispersion compensating fibers) may not be readily available.

Therefore, there is a need in the art for an improved apparatus for forming a WDM signal having orthogonally polarized optical channels of a fiber-optic transmission system.

SUMMARY OF THE INVENTION

Embodiments of the present invention generally are directed to apparatus for forming a WDM signal having pair-wise orthogonally polarized adjacent optical channels of a fiber-optic transmission system, where individual optical channel paths comprise non-polarization-maintaining components and controllers of a state of polarization (SOP).

In one embodiment, an apparatus combines individual optical channels each with a dynamic polarization controller into a WDM signal using a wavelength multiplexer, broadband power splitter and a polarization splitter. The broadband power splitter taps a portion of the WDM signal for use as a feedback signal. Each output from the polarization splitter positioned in the WDM feedback path is further coupled to an odd channel or even channel wavelength demultiplexer. Individual channel feedback signals from the odd or even channel demultiplexer are used to control polarization controllers of the respective optical channels. In operation, through power level control of each feedback signal, adjacent optical channels are maintained in a pair-wise orthogonally polarized state.

In another embodiment, an apparatus comprises wavelength multiplexing devices used to combine odd optical channels each with a dynamic polarization controller into an odd-channel-WDM signal, and even optical channels each with a dynamic polarization controller into an even-channel-WDM signal. Each WDM signal is then coupled to a polarization splitter with polarization maintaining fiber (PMF) on at least one output. An PMF output from each of the two polarization splitters is connected to polarization maintaining input fibers of a polarization combiner that integrates the odd and even WDM signals into a composite pair-wise orthogonally polarized WDM signal. The second output from each polarization splitter is coupled to an odd channel or even channel wavelength demultiplexer, the output of which provides individual channel feedback to each polarization controller. In operation, through power level control of each feedback signal, adjacent pair-wise orthogonally polarized optical channels in the composite WDM signal are maintained at constant power.

BRIEF DESCRIPTION OF THE DRAWINGS

So that the manner in which the above recited features of embodiments of the present invention can be understood in detail, a more particular description, briefly summarized above, may be had by reference to embodiments, some of which are illustrated in the appended drawings. It is to be noted; however, the appended drawings illustrate only typical embodiments of the present invention and are therefore not to be considered limiting of its scope, for the present invention may include other effective embodiments.

To facilitate understanding, identical reference numerals have been used, where possible, to designate identical elements common to the figures.

DETAILED DESCRIPTION

Embodiments of the present invention are generally directed to an apparatus for forming a wavelength division multiplexed (WDM) signal having pair-wise orthogonally polarized adjacent optical channels in a fiber-optic transmission system, such as a long-haul undersea or terrestrial fiber-optic transmission system.

The term "state of polarization" (SOP) in the context of the present invention refers to a direction of polarization of a carrier wavelength of an optical channel of the fiber-optic transmission system, and the system using the WDM signal (s) is referred to as the "WDM system." Hereafter, similar devices, transmission spans, and optical channels of such systems are identified using the same numeric and/or alphabetic references, except that suffixes may be added, where appropriate, to differentiate between specific devices, paths, and channels.

Figure 1:
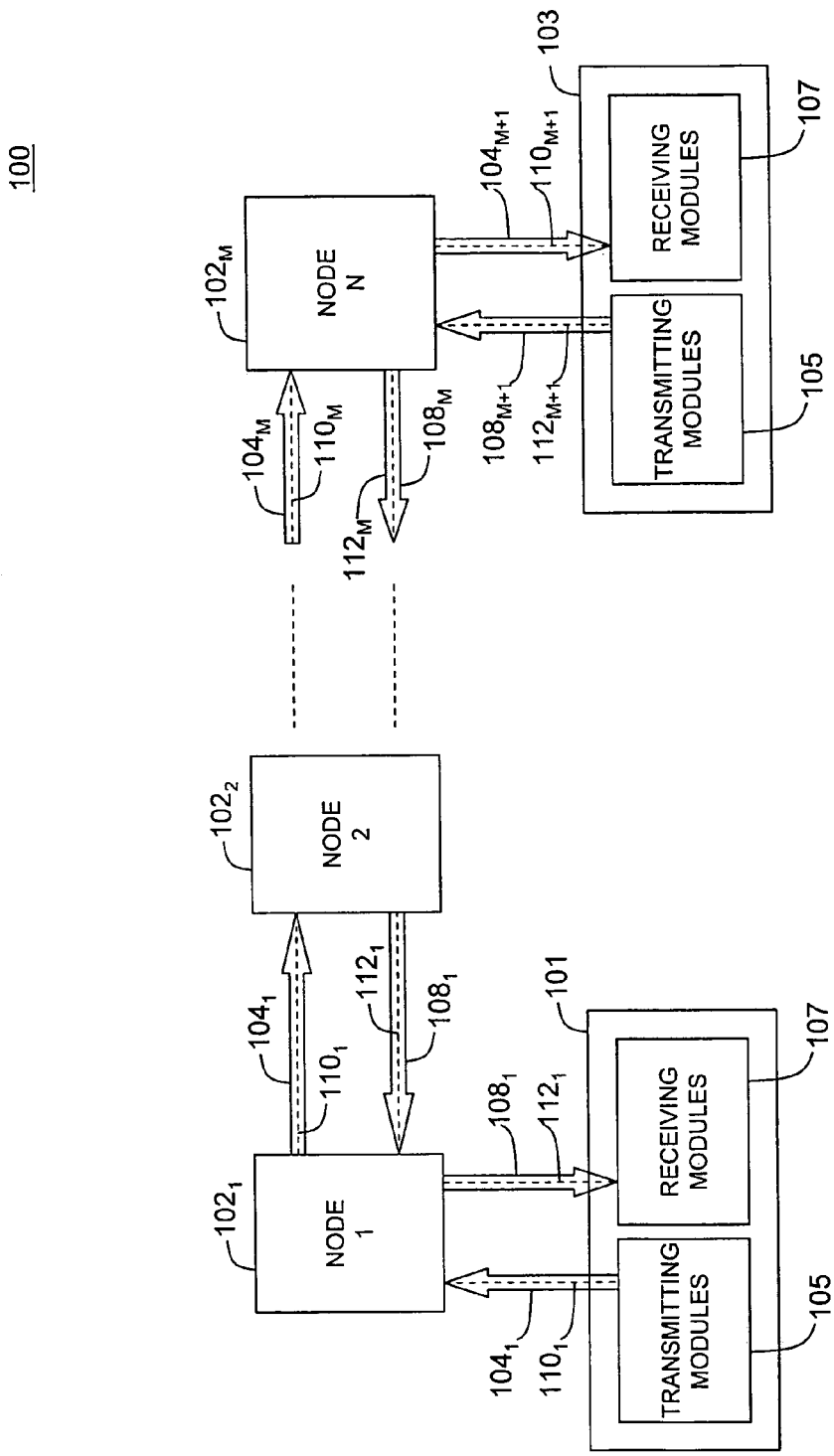
FIG. 1 is a schematic diagram of a WDM fiber-optic transmission system in accordance with one embodiment of the present invention.

FIG. 1 is a high-level schematic diagram of a fiber-optic transmission system 100 in accordance with an embodiment of the present invention. Illustratively, the system 100 is a WDM system comprising end-point terminals 101 and 103, and a plurality M of amplifying nodes 102, where M is an integer $\leq 1$. The nodes 102 are coupled to one another and the terminals 101, 103, using fiber-optic spans 104 and 108.

Each such span includes a plurality of transmission fibers (e.g., about 2 to 16 or more single-mode fibers) 110 and 108, respectively.

A transmission fiber transmits a WDM signal comprising a plurality of N pair-wise orthogonally polarized optical channels (e.g., about 8 to 128 or more optical channels), where N is an integer. Herein, for a purpose of an example, N is an even integer. As such, in the WDM signal, adjacent optical channels have orthogonally-oriented SOPs. Typically, carrier wavelengths of the optical channels are substantially equidistantly disposed within a bandwidth of the WDM signal. However, embodiments of the present invention contemplate WDM signals having non-uniform channel spacing.

In one embodiment, the terminals 101 and 103 include a transmitting module 105 and a receiving module 107; both selectively associated with respective transmission fibers. The transmitting module 105 of an end-point terminal (e.g., terminal 101) combines individual optical channels to form the WDM signal having orthogonally polarized optical channels, as well as conditions (e.g., amplifies, pre-emphasizes, optically filters, and/or dispersion compensates) the WDM signal and launches the signal into the transmission fiber (e.g., fiber $110_1$). The WDM signal is received (e.g., via the fiber $110_{M+1}$) by the receiving module 107 of the other end-point terminal (i.e., terminal 103) which similarly conditions and selectively demodulates the individual optical channels.

Figure 2:
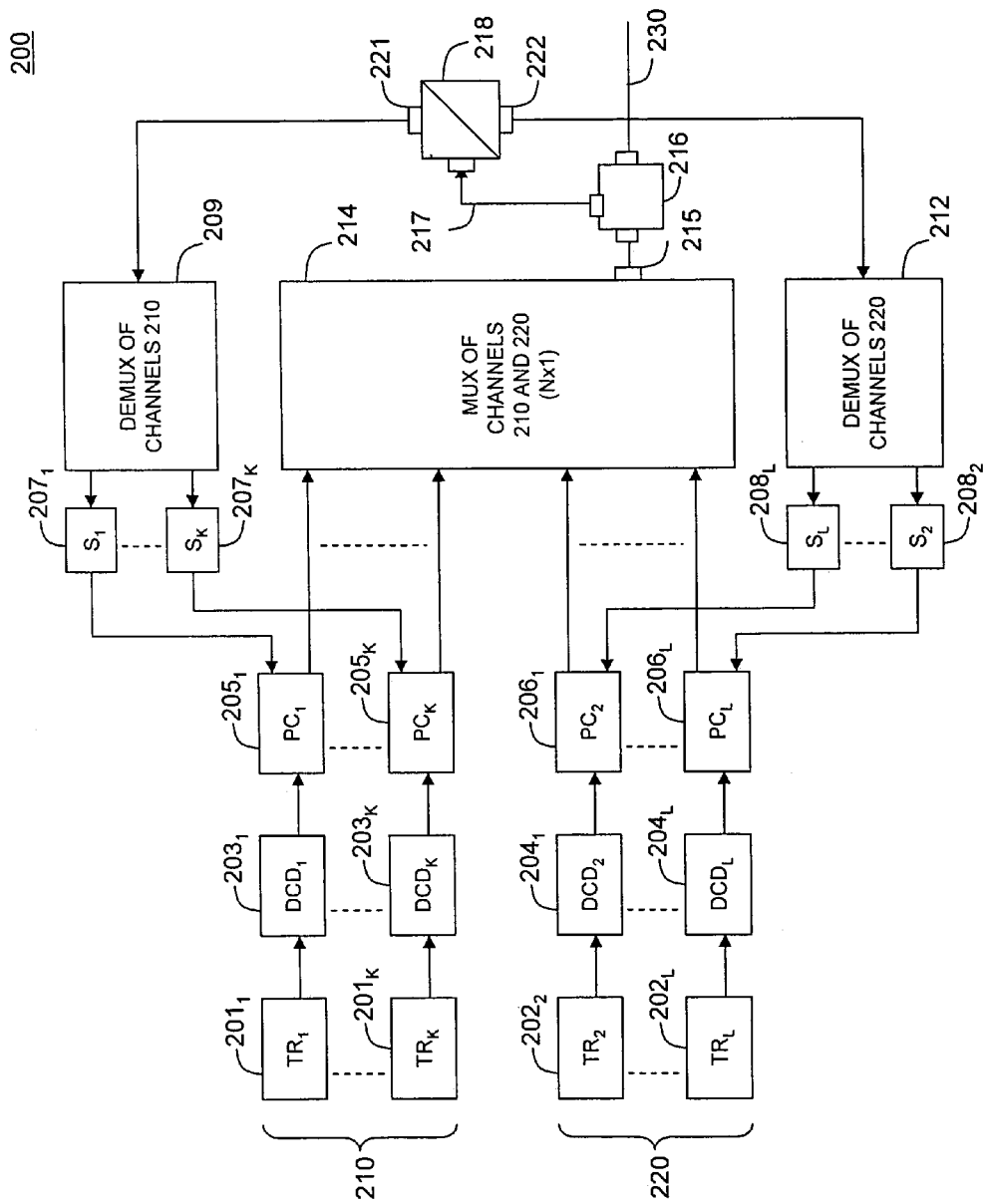
FIG. 2 is a schematic diagram of an apparatus for forming a WDM signal having orthogonally polarized optical channels of the system of FIG. 1 in accordance with one embodiment of the present invention.

FIG. 2 is a schematic diagram of an apparatus 200 for forming a WDM signal having orthogonally-polarized optical channels in accordance with one embodiment of the present invention. The apparatus 200 is a portion of the transmitting module 105 of the system 100 of FIG. 1. In operation, the apparatus 200 forms a WDM signal at output 230 and the input to polarization splitter 218. The WDM signal at the input to 218 comprising N orthogonally polarized optical channels, e.g., odd channels (i.e., channels 1, 3, 5 . . . (N−1)) having a first SOP and even channels (i.e., channels 2, 4, 6 . . . N) having a second SOP that is orthogonal to the first SOP. The WDM signal at the output 230 also comprising N orthogonally polarized optical channels that are arbitrarily transformed from the first and second orthogonal SOPs.

Illustratively, the apparatus 200 comprises a plurality 210 of K odd optical channels having the first SOP, a plurality 220 of L even optical channels having the second SOP, a wavelength multiplexer (MUX) 214, a broadband wavelength insensitive splitter 216, a polarization splitter 218, wavelength demultiplexers (DEMUXs) 209 and 212, and pluralities of optical power sensors 207 and 208, where L+K=N.

In one exemplary embodiment, an optical channel 210 or 220 comprises a transmitter (TR), a dispersion compensation device (DCD), and a polarization controller (PC), which optical output is coupled to a respective input of the MUX 214. The TR is generally a source of an optical signal, such as a semiconductor laser directly or indirectly modulated at about 2.5–40 GHz using an opto-electronic modulator (e.g., LiNbO$_3$ Mach-Zehnder modulator), among other devices. Correspondingly, the DCD is an optical device having, at a carrier wavelength of the respective optical channel, a determined amount of chromatic dispersion, and the PC is an electrically-controlled device capable of unconditionally establishing an appropriate SOP of the optical signal of the channel.

Referring to FIG. 2, the TRs, DCDs, and PCs of the odd channels are denoted as 201, 203 and 205, respectively. The TRs, DCDs, and PCs of the even channels are denoted as 202, 204 and 206, respectively. In the apparatus 200, the TRs and DCDs, as well as the fibers links connecting the components of the optical channels to one another and to the MUX 214, are non-polarization-maintaining devices.

The MUX 214 is shown as an Nx1 combiner of the carrier wavelengths of individual optical channels into the WDM signal that propagates in the transmission system shown in 100 of FIG. 1. In other embodiments, the MUX 214 may further include at least one optical coupler, optical amplifier, and/or variable optical attenuator. In yet another embodiment, the DCDs 203, 204 may be portions of the MUX 214.

In the depicted embodiment, the MUX 214 comprises N inputs and outputs 215 for the WDM signal. Each input of the MUX 214 is coupled to an optical output of the PC of the respective optical channel 210 or 220. The output 215 is generally coupled to a broadband wavelength insensitive splitter 216 and then to input fiber 230 of an optical amplifier (not shown) of the transmitting module 105 or, alternatively, to one of the transmission fibers of the fiber-optic span (e.g., span 104 or 108) terminated at that module. The output 217 of the broadband splitter 216 is coupled to an input of the polarization splitter 218.

In the feedback WDM signal, the polarization splitter 218 separates optical channels that are aligned to a particular set of orthogonally-oriented SOPs as determined by the polarization splitter 218. Specifically, a portion of the WDM signal corresponding to the optical channels having the second SOP is directed to an output 221, and a portion of the WDM signal corresponding to the optical channels having the first SOP is directed to an output 222, respectively.

The outputs 221 and 222 of the splitter 218 are coupled to the DEMUX 209 of the optical channels 210 and the DEMUX 212 of the optical channels 220, respectively. Specifically, the DEMUX 209 demultiplexes the odd channels 210 and selectively outputs each demultiplexed odd channel. The DEMUX 212 demultiplexes the even channels 220 and selectively outputs each demultiplexed even channel. In one embodiment, each of the DEMUXs 209 and 212 comprises a plurality of optical filters (e.g., slicers, interleavers, and the like) that decompose the respective portions of the WDM signal into individual narrow-band optical channels. Each such demultiplexed channel corresponds to one of the optical channels of the WDM signal and is selectively directed to one of the outputs of the respective DEMUX.

Outputs of the DEMUXs 209 and 212 are selectively monitored by optical power sensors 207 and 208 (e.g., photodetectors, and the like), respectively. The sensors 207 and 208 produce feedback signals that are coupled to control inputs of the polarization controllers (i.e., PCs 205 and PCs 206) of the corresponding optical channels. In operation, the power of a feedback signal is proportional to a degree of deviation of the optical channel SOP at the input of splitter 218 from a first SOP established by splitter 218 at 221 (channels 210) or a second SOP established by the splitter 218 at 222 (channels 220).

In the transmitting module 105, in operation, random deviations of the SOP may be a result of various factors, e.g., temperature fluctuations, mechanical stress in the fibers and/or optical elements, and the like. When applied to the polarization controller of the respective optical channel, the feedback signal and control algorithms cause the controller to eliminate the deviations of the SOP from the set of SOPs determined by splitter 218.

Suitable PCs and control algorithms are disclosed, for example, in commonly assigned U.S. patent application Ser.

No. 10/796,930, filed Mar. 10, 2004, the entirety of which is incorporated herein by reference. Specifically, such control algorithms adjust the PCs 205 to minimize the amount of channel power in the feedback path at 221 and adjust the PCs 206 to minimize the amount of channel power in the feedback path at 222, thus facilitating the first SOP in the channels 210 and the second SOP in the channels 220 at the input of polarization splitter 218.

In the apparatus 200, control loops, including the polarization splitter 218, DEMUX 209 and sensors 207 as well as control loops, including the polarization splitter 218, DEMUX 212, and sensors 208, facilitate maintaining the first SOP in the optical channels 210 and the second SOP in the optical channels 220 at the input to the polarization combiner 218. As such, in operation, the WDM signal formed by the apparatus 200 and launched into the fiber 230 also comprises orthogonally polarized optical channels.

Figure 3:
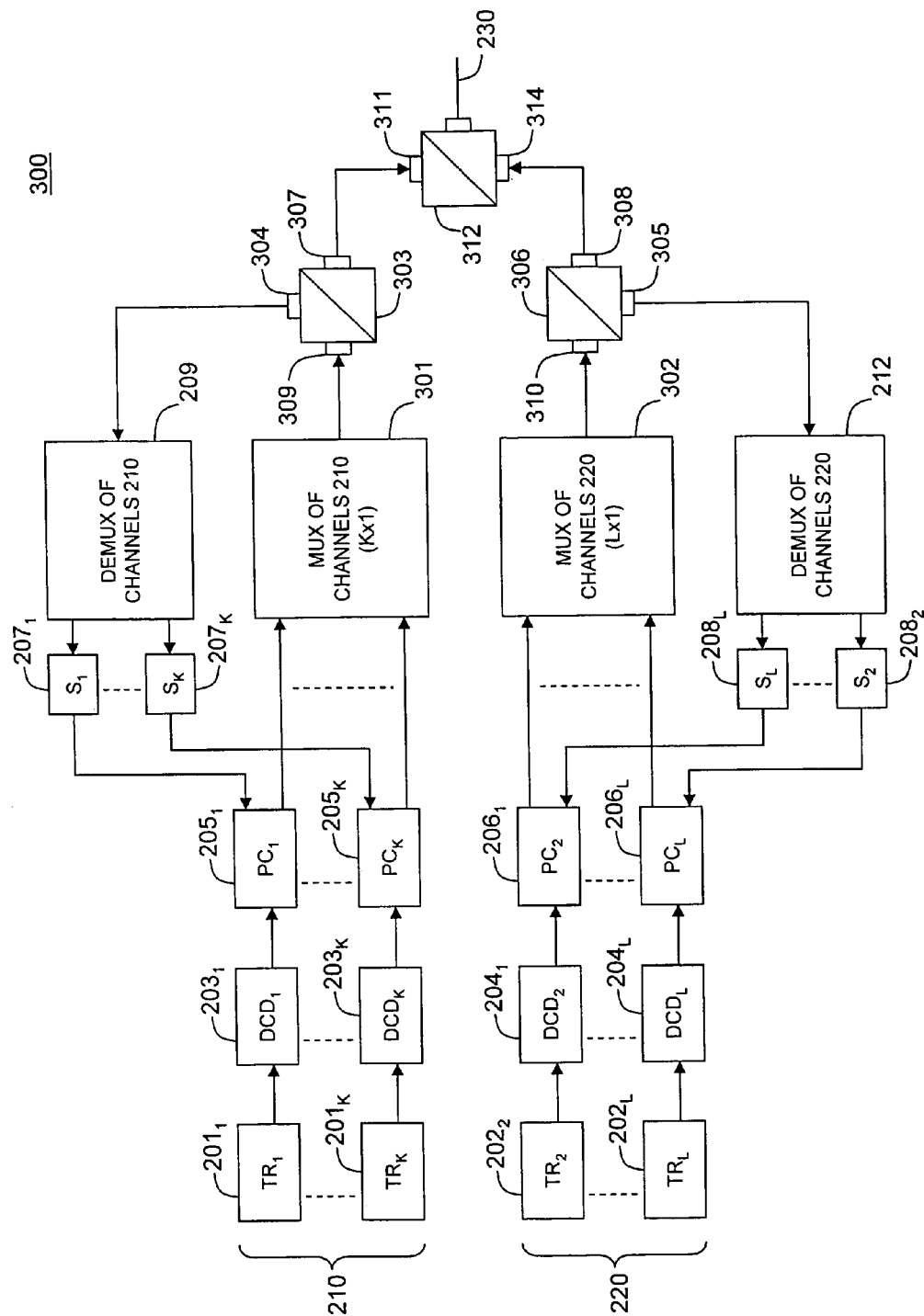
FIG. 3 is a schematic diagram of an apparatus for forming a WDM signal having orthogonally polarized optical channels of the system of FIG. 1 in accordance with another embodiment of the present invention.

FIG. 3 is a schematic diagram of an apparatus 300 for forming a WDM signal having orthogonally polarized optical channels in accordance with another embodiment of the present invention. Similar to the apparatus 200 discussed above in reference to FIG. 2, the apparatus 300 may be a portion of the transmitting module 105 of the system 100 of FIG. 1.

Illustratively, the apparatus 300 comprises a plurality 210 of K odd optical channels having the first SOP, a plurality 220 of L even optical channels having the second SOP, MUXs 301 and 302, polarization splitters 303 and 306, a polarization combiner 312, a DEMUXs 209 and 212, and pluralities of power sensors 207 and 208.

In one embodiment, the optical channels 210 and 220 are selectively combined using a K×1 MUX 301 and a L×1 MUX 302 and then outputted to the polarization splitters 303 and 306. In other embodiments, each of the MUXs 301 and 302 may further include channel conditioning devices (e.g. one or more optical couplers, optical amplifier, DCDs, and/or variable optical attenuators.) In yet another embodiment, the DCDs 203 and 204 may be entirely contained in MUXs 301 and 302, respectively.

The MUX 301 and 302 output signals with multiplexed optical channels 210 (MUX 301) and 220 (MUX 302) respectively are passed to the polarization splitters 303 and 306. In the inputted multiplexed signals, the polarization splitters 303 and 306 separate portions having the first and second SOPs. As discussed with reference to FIG. 2 above, in operation, various factors (temperature fluctuations, mechanical stress in fibers and/or optical elements, and the like) may cause random variations of the SOP in an optical channel (prior to the input 309 or 310).

A polarization splitter 303 separates portions of the inputted multiplexed signal of the optical channels 210 by directing the portion having the second SOP to an output 304 coupled to an input of the DEMUX 209 and directing the portion having the first SOP to an output 307 coupled using PMF to an input 311 of the polarization combiner 312. Accordingly, a polarization splitter 306 separates, portions of the inputted multiplexed signal of the optical channels 220 by directing the portion having the first SOP to an output 305 coupled to an input of the DEMUX 212 and directing the portion having the second SOP to an output 308 coupled using PMF to an input 314 of the polarization combiner 312.

The polarization combiner 312 combines the portion having the first SOP (i.e., optical channels 210) with the portion having the second SOP (i.e., optical channels 220) into the WDM signal propagating in the system 100 of FIG. 1. An output of the polarization combiner 312 may be coupled to the input fiber 230 of an optical amplifier (not shown) of the transmitting module 105 or, alternatively, to one of the transmission fibers of the fiber-optic span (e.g., span 104 or 108) terminated at that module.

The DEMUXs 209 and 212 selectively demultiplex the odd optical channels 210 (DEMUX 209) and the even optical channels 220 (DEMUXs 212). As such, in the apparatus 300, optical channels having small spectral spacing (i.e., small difference between carrier wavelengths of adjacent channels) may be demultiplexed with a high feedback signal-to-noise ratio (SNR). In one exemplary embodiment, the spectral spacing between the adjacent channels may be in a range from about 25 to 50 GHz.

The demultiplexed optical channels 210 and 220 are monitored using the power sensors 207 and 208, as described above with reference to FIG. 2. The feedback signals from the sensors 207 and 208 are used in a control algorithm similar to that of the apparatus 200 and directed to minimizing power in the feedback path proportional to the unwanted SOP at 309 or 310.

In operation, control loops, including the MUXs 301, polarization splitter 303, DEMUX 209, and sensors 207, maintain the first SOP in the optical channels 210, as well as the control loops, including the MUXs 302, polarization splitter 306, DEMUX 212, and sensors 208, maintain the second SOP in the optical channels 220. After the optical channels 210 and 220 are multiplexed using the MUXs 301 and 302, the polarization splitters 303 and 306 direct the channels 210 and 220 to the polarization combiner 312 that integrated them in the WDM signal having orthogonally polarized optical channels.

While the foregoing is directed to embodiments of the present invention, other and further embodiments of the present invention may be devised without departing from the basic scope thereof, and the scope thereof is determined by the claims that follow.

The invention claimed is:

1. An apparatus for forming a WDM signal having orthogonally polarized optical channels without using polarization maintaining fiber outside the transmitter, comprising:

an N×1 wavelength multiplexer for combining a first and a second plurality of optical channels, the multiplexer having an output adapted for outputting the WDM signal, where an optical signal of each channel of said first plurality of optical channels has a first state of polarization (SOP) and an optical signal of each channel of said second plurality of optical channels has a second state of polarization (SOP);

a broadband wavelength insensitive splitter for tapping a portion of the WDM signal power;

a polarization splitter coupled to the first output of the broadband splitter, the polarization splitter having a first output for the optical signals having the second SOP and a second output for the optical signals having the first SOP;

a first wavelength demultiplexer of the first plurality of the optical channels, the demultiplexer coupled to the first output of the polarization splitter;

a second wavelength demultiplexer of the second plurality of the optical channels, the demultiplexer coupled to the second output of the polarization splitter; and a plurality of sensors of optical power of a respective optical channel, each sensor coupled to a control input of the polarization controller of the respective optical channel, wherein the first SOP is orthogonal to the second SOP.

2. The apparatus of claim 1, wherein adjacent optical channels have orthogonally-oriented states of polarization.

3. The apparatus of claim 1, said apparatus further comprising a source and a polarization controller associated with each optical channel.

4. The apparatus of claim 3, wherein each said source comprises a directly or indirectly modulated laser or a non-modulated laser source.

5. The apparatus of claim 1, said apparatus further comprising a dispersion compensation device associated with each optical channel.

6. The apparatus of claim 1, wherein the multiplexer comprises at least one device selected from a group consisting of a wavelength combiner, a wavelength insensitive coupler, an optical amplifier, a variable attenuator, and a dispersion compensation device.

7. The apparatus of claim 1, wherein the apparatus is a portion of a WDM optical system.

8. The apparatus of claim 7, wherein the second output of a broadband splitter is coupled to a transmission fiber of the WDM optical system.

9. An apparatus for forming a WDM signal having orthogonally polarized optical channels, comprising:
a first wavelength multiplexer of the first plurality of optical channels, where an optical signal of each channel of said first plurality of optical channels has a first state of polarization (SOP);
a first polarization splitter coupled to an output of the first multiplexer, the splitter having a first output for the optical signals having the second SOP and a second output for the optical signals having the first SOP;
a first wavelength demultiplexer of the first plurality of optical channels, the demultiplexer coupled to the first output of the first splitter;
a first plurality of sensors optical power of a respective optical channel of the first plurality of the optical channels, each sensor coupled to a control input of the polarization controller of the respective optical channel;
a second wavelength multiplexer of the second plurality of the optical channels, where an optical signal of each channel of said second plurality of optical channels has a second state of polarization (SOP);
a second polarization splitter coupled to an output of the second multiplexer, the splitter having a first output for the optical signals having the first SOP and a second output for the optical signals having the second SOP;
a second wavelength demultiplexer of the second plurality of the optical channels, the demultiplexer coupled to the first output of the second splitter;
a second plurality of sensors of optical power of a respective optical channel of the second plurality of the optical channels, each sensor coupled to a control input of the polarization controller of the respective optical channel; and
a polarization combiner having a first input coupled to the second output of the first polarization splitter using polarization-maintaining fiber, a second input coupled to the second output of the second polarization splitter using polarization-maintaining fiber, and an output for outputting the WDM signal, wherein the first SOP is orthogonal to the second SOP.

10. The apparatus of claim 9, wherein adjacent optical channels have orthogonally-oriented states of polarization.

11. The apparatus of claim 9, said apparatus further comprising a source and a polarization controller associated with each optical channel.

12. The apparatus of claim 11, wherein each said source comprises a directly or indirectly modulated laser or a non-modulated laser source.

13. The apparatus of claim 9, said apparatus further comprising a dispersion compensation device associated with each optical channel.

14. The apparatus of claim 9, wherein each multiplexer comprises at least one device selected from a group consisting of a wavelength combiner, a wavelength insensitive coupler, an optical amplifier, a variable attenuator, and a dispersion compensation device.

15. The apparatus of claim 9, wherein the apparatus is a portion of a WDM optical system.

16. The apparatus of claim 15, wherein the output of the polarization combiner is coupled to a transmission fiber of the WDM optical system.

17. A method of forming a WDM signal comprising:
combining at least a first plurality of optical channels into an aggregate signal;
demultiplexing a first portion of said aggregate signal into said first plurality of optical channels to provide demultiplexed channels;
sensing an optical power associated with each of said demultiplexed channels;
controlling the polarization of each of said demultiplexed channels in response to said optical power associated with each of said demultiplexed channels;
providing a second portion of said aggregate signal as at least a portion said WDM signal.

18. A method according to claim 17, wherein an optical signal of each channel of said first plurality of optical channels has a first state of polarization (SOP), and wherein said method further comprises:
combining a second plurality of optical channels into said aggregate signal, where an optical signal of each channel of said second plurality of optical channels has a second SOP orthogonal to said first SOP;
demultiplexing said first portion of said aggregate signal into said second plurality of optical channels to provide second demultiplexed channels;
sensing an optical power associated with each of said second demultiplexed channels; and
controlling the polarization of each of said second demultiplexed channels in response to said optical power associated with each of said second demultiplexed channels.

19. A method according to claim 17, wherein said optical signal of each channel of said first plurality of optical channels has a first state of polarization (SOP), and wherein said method further comprises:
combining a second plurality of optical channels into a second aggregate signal, where an optical signal of each channel of said second plurality of optical channels has a second SOP orthogonal to said first SOP;
demultiplexing a first portion of said second aggregate signal into said second plurality of optical channels to provide second demultiplexed channels;
sensing an optical power associated with each of said second demultiplexed channels; and
controlling the polarization of each of said second demultiplexed channels in response to said optical power associated with each of said second demultiplexed channels; and
providing a second portion of said second aggregate signal as at least a portion said WDM signal.

* * * * *